United States Patent
Wright et al.

(10) Patent No.: US 7,871,326 B2
(45) Date of Patent: Jan. 18, 2011

(54) METHOD OR APPARATUS FOR DETERMINING PERFORMANCE DATA IN A GAMING SYSTEM

(75) Inventors: Dean Wright, Taren Point (AU); Stephen Cowan, Taren Point (AU)

(73) Assignee: Paltronics Australasia Pty Limited, New South Wales (AU)

( * ) Notice: Subject to any disclaimer, the term of this patent is extended or adjusted under 35 U.S.C. 154(b) by 649 days.

(21) Appl. No.: 11/579,666

(22) PCT Filed: May 8, 2005

(86) PCT No.: PCT/AU2005/000659

§ 371 (c)(1), (2), (4) Date: Nov. 7, 2006

(87) PCT Pub. No.: WO2005/107901

PCT Pub. Date: Nov. 17, 2005

(65) Prior Publication Data

US 2007/0218976 A1    Sep. 20, 2007

(30) Foreign Application Priority Data

May 10, 2004    (AU) .............................. 2004902469

(51) Int. Cl.
    *G06F 17/00*    (2006.01)
(52) U.S. Cl. ........................................................ 463/25
(58) Field of Classification Search .............. 463/16–25
    See application file for complete search history.

(56) References Cited

U.S. PATENT DOCUMENTS

| | | | |
|---|---|---|---|
| 5,116,055 A | 5/1992 | Tracy | |
| 5,280,909 A | 1/1994 | Tracy | |
| 5,393,057 A | 2/1995 | Marnell, II | |
| 6,012,982 A | 1/2000 | Piechowiak et al. | |
| 6,062,981 A | 5/2000 | Luciano, Jr. | |
| 6,110,043 A | 8/2000 | Olsen | |
| 6,155,925 A | 12/2000 | Giobbi et al. | |
| 6,283,855 B1 | 9/2001 | Bingham | |
| 6,312,333 B1 | 11/2001 | Acres | |
| 6,358,149 B1 | 3/2002 | Schneider et al. | |
| 6,471,591 B1 | 10/2002 | Crumby | |

(Continued)

FOREIGN PATENT DOCUMENTS

AU    714299 B1    12/1999

(Continued)

*Primary Examiner* — Ronald Laneau
(74) *Attorney, Agent, or Firm* — Sterne, Kessler, Goldstein & Fox P.L.L.C.

(57) ABSTRACT

A method, performed by a gaming machine, of displaying performance data. The method includes recording data indicative of the receipt of gaming credit units from a user, wherein the gaming credit units are used as consideration for participation in a chance-based gaming activity provided via the gaming machine. The credit record is updated when a gaming credit unit is used as consideration. The cumulative value of any prize awarded to a user is recorded in a cumulative prize record. The value of the credit used in a used credit record is recorded. During a play session, a first display area displays the value of the credit record to a user. A second display area displays the cumulative prize record; and a third display area displays the value of the used credit record.

12 Claims, 4 Drawing Sheets

U.S. PATENT DOCUMENTS

| | | | |
|---|---|---|---|
| 6,565,434 | B1 | 5/2003 | Acres |
| 6,585,592 | B1 | 7/2003 | Crumby |
| 6,656,048 | B2 | 12/2003 | Olsen |
| 7,416,489 | B2 * | 8/2008 | Smith, III .................... 463/42 |
| 2003/0036429 | A1 | 2/2003 | Witty et al. |
| 2003/0162588 | A1 | 8/2003 | Brosnan et al. |
| 2004/0053679 | A1 | 3/2004 | Getz et al. |
| 2004/0087368 | A1 | 5/2004 | Gauselmann |
| 2004/0204247 | A1 * | 10/2004 | Walker et al. ................ 463/42 |
| 2009/0093300 | A1 * | 4/2009 | Lutnick et al. ................ 463/26 |

FOREIGN PATENT DOCUMENTS

| | | | |
|---|---|---|---|
| AU | 2003/203674 | B1 | 10/2003 |
| AU | 2003/246319 | B2 | 10/2003 |
| AU | 783417 | B2 | 10/2005 |
| EP | 0 874 337 | A1 | 10/1998 |
| GB | 2 139 390 | A | 11/1984 |
| JP | 2001/195359 | A | 7/2001 |
| WO | WO 96/12262 | A1 | 4/1996 |
| WO | WO 01/15790 | A1 | 3/2001 |
| WO | WO 02/103586 | A1 | 12/2002 |
| WO | WO 2005/008514 | A1 | 1/2005 |
| WO | WO 2005/042123 | A1 | 5/2005 |
| WO | WO 2005/083599 | A1 | 9/2005 |
| WO | WO 2005/107899 | A1 | 11/2005 |
| WO | WO 2005/107901 | A1 | 11/2005 |
| WO | WO 2005/107913 | A1 | 11/2005 |
| WO | WO 2005/107914 | A1 | 11/2005 |

* cited by examiner

Figure 4

METHOD OR APPARATUS FOR DETERMINING PERFORMANCE DATA IN A GAMING SYSTEM

FIELD OF THE INVENTION

The present invention relates to a method or apparatus for determining performance data in a gaming system.

The invention has been developed primarily for use with a gaming terminal or a plurality of interlinked gaming terminals in one or more gaming establishments and will be described hereinafter predominantly with reference to this application. However, the invention is not limited to that particular field of use and is also suitable for use with online gaming, lotto, pools, lotteries, art unions, bingo, raffles and other games involving one or more wagers being placed upon an outcome having a finite probability of occurring. Additionally, the invention is applicable to any type of gaming, such as gaming that may be entered into on a personal computer via the Internet, for example.

BACKGROUND

The discussion of the prior art within this specification is to assist the addressee in understanding the invention and is not an admission of the extent of the common general knowledge in the field of the invention and is included without prejudice.

It is known to "link" gaming terminals to provide a number of additional functionalities. This includes the ability to control the awarding of a prize, as the pool of available funds is greater and the amount of funds available is known rather than having to be estimated. Another functionality of interlinked gaming terminals is that secondary gaming is possible. For example, for a given group of interlinked gaming terminals, a central display provides the gamers with a visual indication of a presently available jackpot prize that is being incrementally increased or decreased as the gamers operate the interlinked gaming terminals.

It is known by the gamers that the prize will be awarded when it is incremented or decremented to a randomly selected trigger value. The trigger value is determined randomly within a set of limits that typically will also be visually indicated to the gainers by the display. The use of such functionality is intended to provide additional impetus to the gamers to play the terminals and thereby win the jackpot prize in addition to any prize available to be awarded by the respective terminal.

In known gaming machines two elements of information are displayed to the user in addition to the display of the game itself. The first element is the remaining credit attributed to the user and the second element is the amount won (if any) for the game just played. In some known gaming machines a third element of information is displayed which is the amount bet or wagered on the game just played.

One problem with gaming machines is that large quantities of money can be input by a user without this being realized by the user. This problem is further compounded when a win is paid out which in some situations encourages the input of yet more money. In some cases, no win being paid encourages the input of further money.

SUMMARY OF THE INVENTION

It is an object of the present invention to overcome or ameliorate at least one of the disadvantages of the prior art, or to provide a useful alternative.

According to a first aspect of the present invention there is provided a method of determining performance data in a gaming system, the method comprising the steps of:
 a) recording the receipt of one or more gaming credit units from a user in a credit record;
 b) updating the credit record when credit is used;
 c) recording the cumulative value of any prize awarded to a user in a cumulative prize record; and
 d) displaying data indicative of the value of the credit record and the cumulative prize record to the user.

In a preferred embodiment, the method further comprises the step of:
 e) recording the value of the credit used in a used credit record and displaying data indicative of the value of the used credit record to the user.

Preferably, the value of the cumulative prize record is paid out under the control of the user.

According to a second aspect of the present invention there is provided a method of determining performance data in a gaming system, the method comprising the steps of:
 a) recording the receipt of one or more gaming credit units from a user in a credit record;
 b) updating the credit record when credit is used;
 c) recording the value of the credit used in a used credit record; and
 d) displaying data indicative of the value of the credit record and the used credit record to the user.

In a preferred embodiment the method further comprises the step of:
 e) recording the cumulative value of any prize awarded to a user in a cumulative prize record and displaying data indicative of the value of the cumulative prize record to the user.

According to a third aspect of the present invention there is provided apparatus for determining performance data in a gaming system, the apparatus comprising:
 a) a credit record for recording the receipt of one or more gaming credit units from a user;
 b) a cumulative prize record for recording the cumulative value of any prize awarded to a user; and
 c) a display for displaying data indicative of the value of the credit record and the cumulative prize record to the user.

According to a fourth aspect of the present invention there is provided apparatus for determining performance data in a gaming system, the apparatus comprising:
 a) a credit record for recording the receipt of one or more gaming credit units from a user;
 b) a used credit record for recording the value of the credit used; and
 c) a display for displaying data indicative of the value of the credit record and the used credit record to the user.

In some embodiments the value of any prize awarded to the user is transferable to the credit record under the control of the user. In other embodiments when any prize is awarded to the user, data indicative of the value of the prize is displayed to the user separately from the displays of the other data. In further embodiments the value of the credit record is paid out under the control of the user.

According to a fifth aspect of the present invention there is provided a method of determining performance data in a gaming apparatus, the method comprising the steps of:
 a) recording data indicative of the total credit used for a period of gaming machine use;
 b) recording data indicative of the total winnings awarded to a user for the period of gaming machine use; and c) using the recorded data to provide an indication to the user of the difference between the value of the total used credit and total winnings awarded for the period of gaming machine use.

According to a sixth aspect of the present invention there is provided apparatus for determining performance data in a gaming machine, the apparatus comprising:

a) a used credit meter for recording data indicative of the total credit used for a period of gaming machine use;

b) a prize meter for recording data indicative of the total winnings awarded to a user for the period of gaming machine use; and c) a controller operable to process the recorded data to provide an indication to the user of the difference between the value of the total used credit and total winnings awarded for the period of gaming machine use.

Unless the context clearly requires otherwise, throughout the specification the words "comprise", "comprising" and the like are to be construed in an inclusive as opposed to en exclusive sense; that is to say, in the sense of "included, but not limited to".

BRIEF DESCRIPTION OF THE DRAWINGS

Preferred embodiments of the invention will now be described, by way of example only, with reference to the accompanying drawings in which.

DETAILED DESCRIPTION

Figure 1:
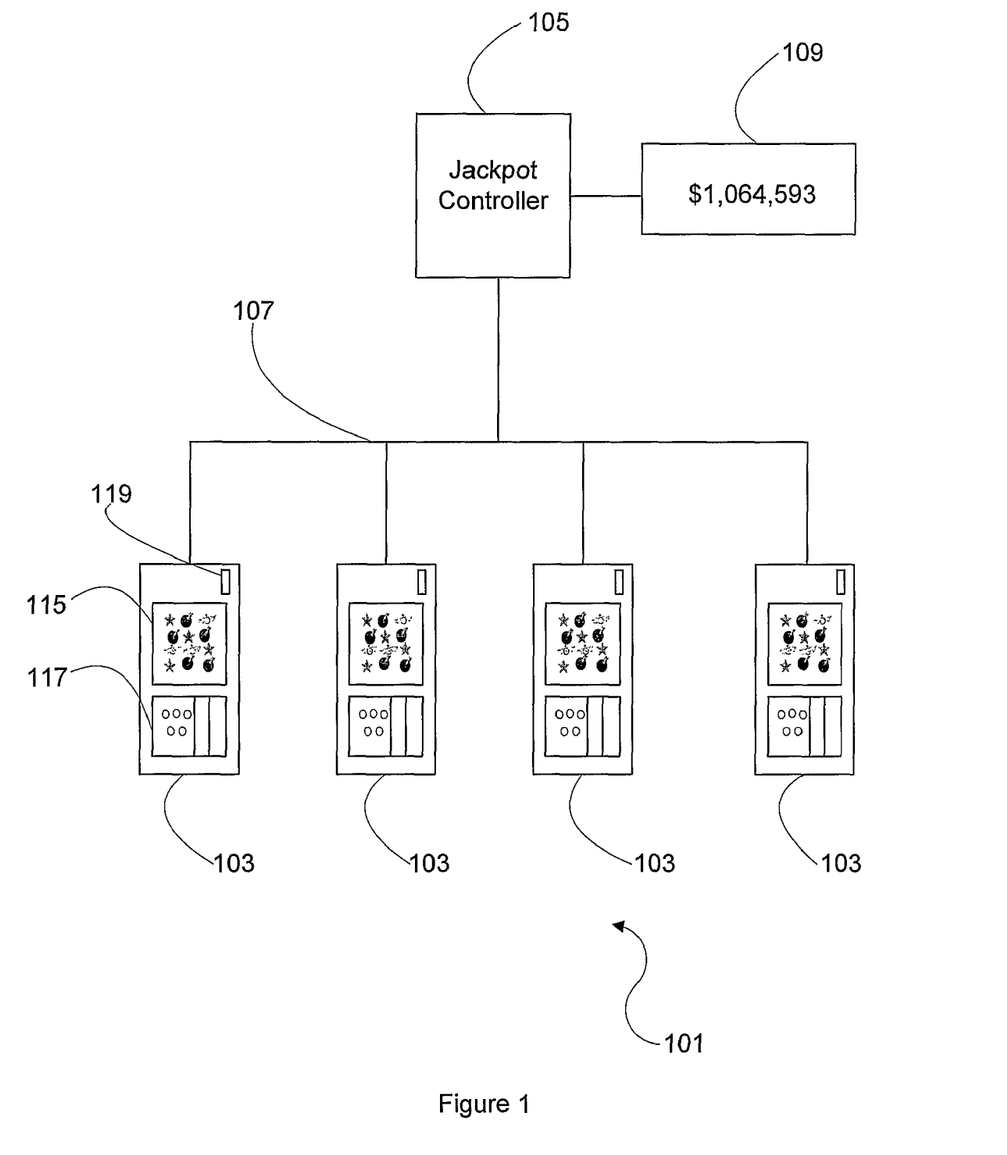
FIG. 1 is a schematic depiction of a gaming system comprising gaming terminals.

FIG. 1 shows a gaming system 101 comprising a number of gaming machines 103 in communication with a system controller 105 via a network 107. The system controller 105 is also connected to a display 109. Each gaming machine 103 comprises a screen 115 for displaying the game, which the terminal 103 offers, and a set of user controls and displays 117 through which a user (not shown) inputs their choices in the running of the game. Each gaming machine also comprises a payment port 119 such as a coin slot or electronic card reader to enable the user to enter gaming credit units for the game or games to be played.

In return for a user submitting a gaming credit unit or an equivalent suitable payment via the payment port 119 the gaming machine 103 enables the user to play a game of chance. The game may result in the user winning a prize. The likelihood of a gaming machine 103 awarding a prize for a particular game play is determined by the design of the game.

In the arrangement of FIG. 1, users are able to participate in two games that are linked. The first game is provided by the gaming machines 103 as described above, and the jackpot controller 105 provides a second game. The second game is a communal jackpot built up from contributions from each of the gaming machines 103. The jackpot is incremented towards an upper limit by the value of each contribution as it is received from the gaming machines 103 via the network 107. The jackpot controller 105 uses the display 109 to show the current value of the jackpot to the users of the gaming machines 103. The jackpot controller 105 is arranged to award the jackpot prize when the jackpot value increments over an undisclosed threshold. The threshold is set randomly or pseudo randomly on initialization of the system controller 105 or after the system controller 105 is reset in response to the award of a jackpot.

Figure 2:
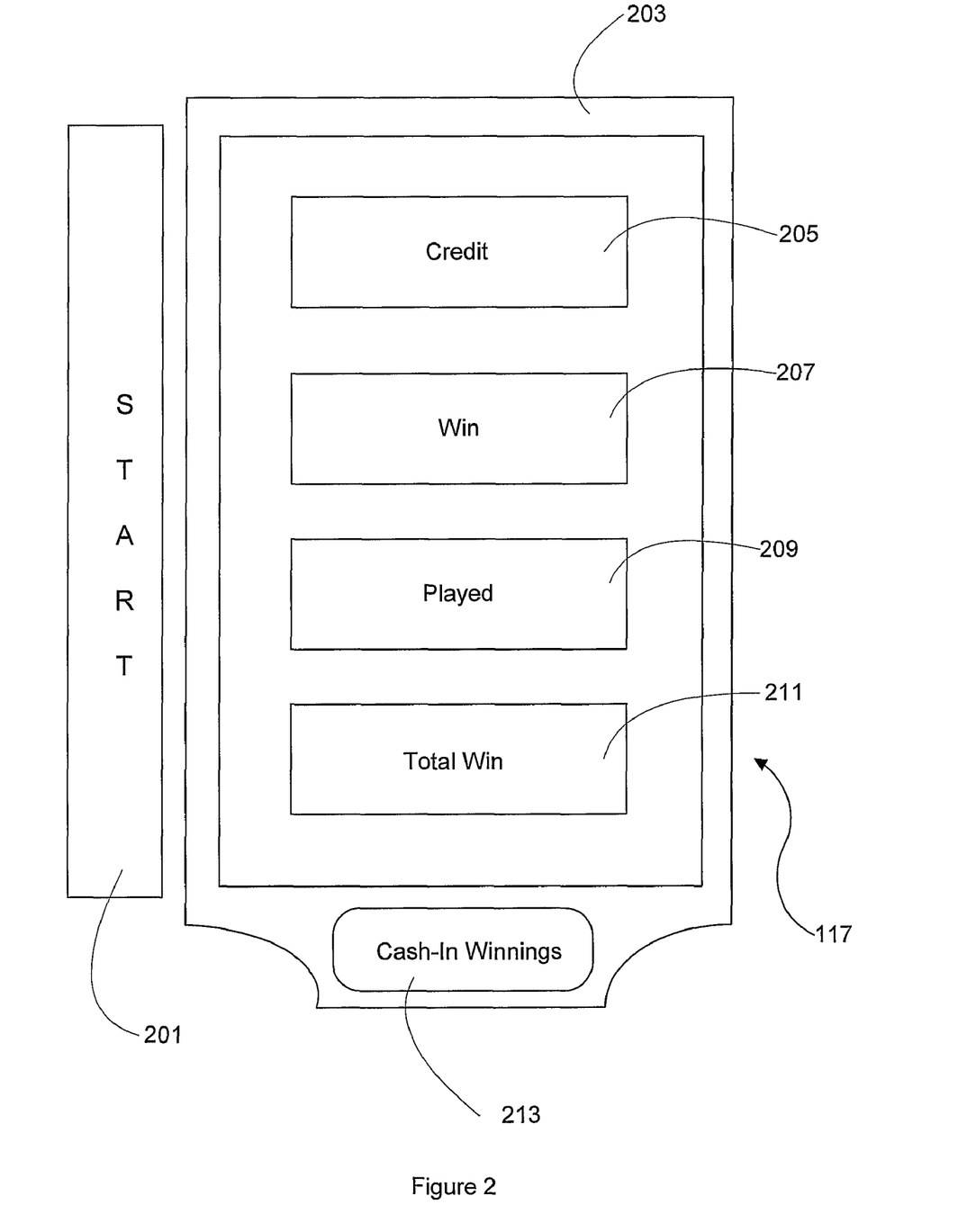
FIG. 2 is a schematic representation of a control panel associated with one of the gaming terminals of FIG. 1.

The winnings for a given game and the remaining credit available for any subsequent games, are displayed to the user via the display on the control panel 117 of the gaming machine 103 shown in FIG. 1. FIG. 2 shows the relevant part of the control panel 117 in further detail which is located adjacent a button 201 arranged to start each game play. This relevant part of the control panel is referred to as the payout control 203. The payout control 203 comprises a combination of buttons, displays and display buttons that are used to display information to a user. Each button can be actuated by a user to indicate the selection of a given choice. The buttons/displays comprise a first "Credit" display button 205, a second "Win" display button 207, a third "Played" display 209 a fourth "Total Win" display button 211 and a fifth "Cash-In Winnings" button 213.

The "Credit" display 205 is arranged to show the credit available to the user to pay for subsequent game plays and the "Win" display button 207 displays any winnings for the most recently played game. The "Played" display 209 displays the amount of credit that the user has spent or used in playing the games in a given session. The "Total Win" display button 211 displays the total cumulative winnings in the given session. The buttons 205, 207, 209, 211, 213 are arranged together to display the information outlined above and to enable the user to control the use of any winnings.

At any time the user can actuate either the "Win" or "Total Win" display buttons 207, 211 and then actuate either the "Credit" display button 205 or the "Cash-In Winnings" button 213. Actuation of the "Credit" display button 205 results in the winnings associated with either the "Win" or "Total Win" display buttons being added to the available credit and being displayed accordingly. Actuation of the "Cash-In Winnings" button 205 results in the winnings associated with either the "Win" or "Total Win" display buttons being paid out to the user in an appropriate manner.

Figure 3:
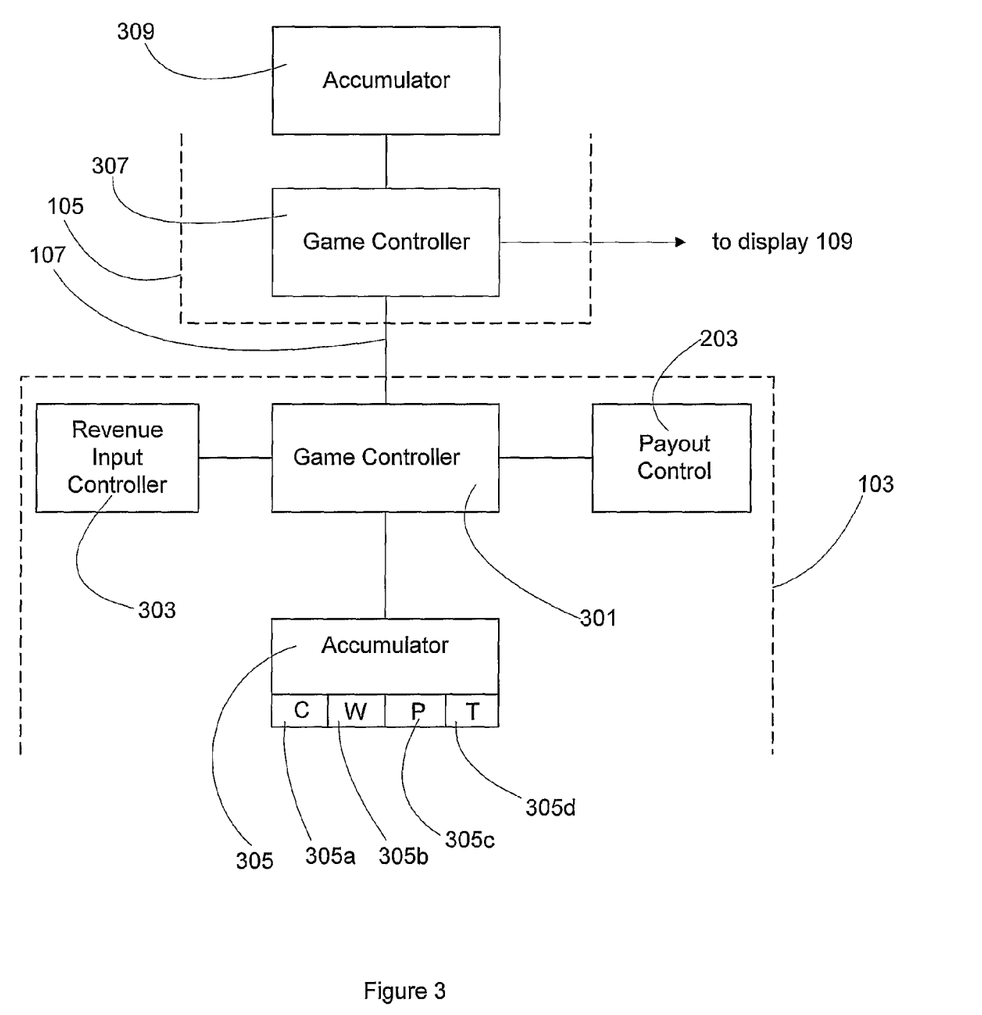
FIG. 3 is a schematic representation of the hardware associated with each of the gaming terminals of FIG. 1.

FIG. 3 illustrates part of the hardware of one of the gaming machines 103 and the jackpot controller 105. The payout control 203 is connected to a first game controller 301 which is connected to a revenue input controller 303 and a first accumulator 305. The first accumulator comprises four elements, a credit meter 305a, a win meter 305b, a played meter 305c and a total winnings meter 305d. Each meter 305a, 305b, 305c, 305d is used to provide a record of the credit available, the winnings for a given game, the cumulative winnings and the credit used respectively. The game controller 301 is also connected via the network 107 to a second game controller 307 in the jackpot controller 105. The game controller 307 is also connected to a second accumulator 309, which is connected to the display 109.

The revenue input controller 303 is operable to accept monetary input from a user in the form of coins or notes, tokens, payment card or other suitable form of payment via the payment port 119. The revenue input controller 303 indicates the amount of the payment to the game controller 301, which responds by adding the input value to the accumulator 305. The accumulator 305 uses the credit meter 305a to record the credit received via the revenue input controller 303. The game controller 301 is the element in the gaming machine that actually runs the first game in response to user commands input via the control panel 117 (FIG. 1)

Each time a game is played the game controller 301 deducts the appropriate amount from the credit meter 305a and adds the same amount to the played meter 305c. The game controller 301 also controls the paying out prizes for the first game as they are won and records such events in the win meter 305b and the total cumulative winnings meter 305d. The game controller is also arranged to communicate with the second game controller 307. This communication includes data that identifies to the second game controller 307 which of the gaming machines 103 has provided a given contribution. The game controller 301 displays the contents of the meters 305a, 305b, 305c, 305d via the corresponding displays 205, 207, 209, 211. The operation of the payout controller will be described in further detail below.

The second game controller 307 responds to the signals from the first game controller by adding the contribution to the accumulator 209 and updating the display 109 (FIG. 1) with the revised jackpot value. The second game controller 307 is the element of the jackpot controller 105 that runs the second game. In other words, the game controller 307 sets the non-disclosed threshold value at which the jackpot will be paid out, receives signals from the gaming machines 103 and updates the accumulator 309 and the display 109 with that value.

The game controller 307 initiates a prize payout when a contribution added to the accumulator 309 causes the jackpot to meet or exceed the payout threshold. When this occurs the game controller 307 identifies which of the gaming machines 103 triggered the jackpot and sends a signal to the identified machine. The gaming controller 301 of the identified gaming machine 103 responds to this signal by indicating to the user that the jackpot has been awarded and paying out the jackpot amount. In response to a jackpot award occurring the game controller 307 also resets the jackpot value and generates a new payout threshold before receiving further signals from the gaming machines 103 and incrementing the jackpot value in the accumulator 309 accordingly. Prizes paid out for the second game by the first game controller 301 are also recorded in the win and total winnings meters 305b, 305d.

Figure 4:
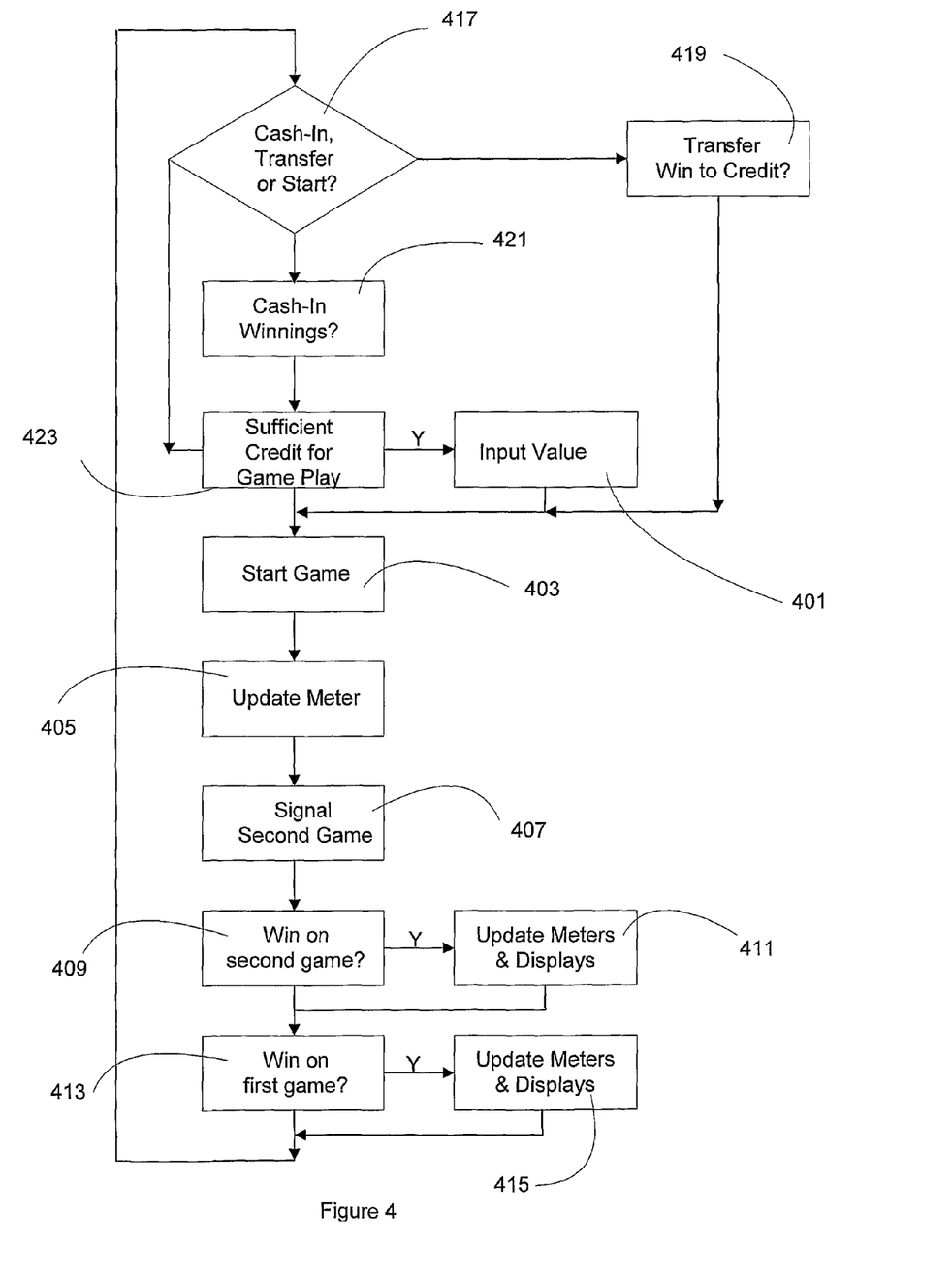
FIG. 4 is a flow chart showing steps performed by the gaming machines of FIG. 1.

The operating process of one of the gaming machines 103 will now be described with reference to the flow chart of FIG. 4. At the first step 401 the gaming machine 103 has just been switched on for the first time. In other words, the machine has just been commissioned and the accumulator 205 and its meters 305a, 305b, 305c, 305d are set to zero. The process holds at step 401 until a user inputs some monetary value at which point processing moves to step 403.

At step 403, in response to a user actuating the start button 201 the gaming controller starts the game play sequence and while the game is in progress processing continues to step 405. At step 405 the credit meter 305a and the played meter 305c are updated along with the corresponding displays 205, 209 with the value paid by the user for the game in progress. Processing then moves to step 407 where the gaming controller 301 extracts from the accumulator the appropriate contribution for the second game and signals this to the second game controller in combination with an indication of the identity of the current gaming machine 103.

Processing then moves to step 409 where it is determined whether a jackpot prize is due in response to any return signal from the second game controller 307. If a prize is due then processing moves to step 411 where the prize is paid and the win and total win meters 305b, 305d are updated along with the corresponding displays 207, 211. The process then moves to step 419. If however no jackpot prize signal arrives from the second gaming controller 301 before the end of the game play of the first game then processing moves from step 409 to step 413.

At step 413 it is determined whether a prize is due as a result of the end sequence of the current first game play. If a prize is due then processing moves to step 415 where the prize is added to the win and total winnings meters 305b, 305d and the corresponding displays 207, 211 updated. Processing then moves to step 417. If no prize is due in step 413 then processing moves straight to step 417.

At step 417 the gaming machine 103 prompts the user to make a choice of cashing in any current winnings, transferring them to the credit meter or starting another game. The user is prompted via the appropriate display elements of the payout control 203. The user can select to transfer winnings by actuating either the win display button 207 or the total winnings button 211 in response to which processing moves to step 419. This selection step enables the user to make a conscious decision on whether to use any winnings for subsequent game play or to have the winnings paid out. This gives the user a greater degree of control over their gaming activity. At step 419 the contents of either the win or total won meters 305b, 305d are transferred to the credit meter 205 in accordance with the actuated button. The displays of the payout control 203 are updated to reflect the changes to the meters 305a, 305b, 305d.

If at step 417 the user actuated the cash in winnings button 213 then processing moves to step 421 where the contents of the total winnings meter 305d is paid out to the user in the appropriate manner. The displays of the payout control 203 are updated to reflect the changes to the win and total winnings meters 305b, 305d. Processing then moves to step 423. If at step 417 the user actuated the start button then processing moves to step 423.

At step 423, the gaming controller 201 establishes whether enough credit remains for a further game play and if not processing moves to step 401 where the user is prompted to input more credit. After a predetermined time has elapsed waiting for more credit to be received the game controller 301 resets the meters 305a, 305b, 305c, 305d on the assumption that the next user will be a new player. If at step 423 sufficient credit remains then processing moves to step 403 and continues as described above for that step.

In some embodiments the payout control may be provided without a win meter or alternatively without a total winnings meter. Similarly the payout control may be provided without a played meter and associated display. In other words, the following combinations of display to the user are possible:

a remaining credit meter and a total cumulative win meter;
a credit meter and a credit played meter; and
a credit played meter and a total cumulative win meter;

In other embodiments the prize just won or the total prizes won along with any remaining credit units are paid out to the user in response to an appropriate instruction. In another embodiment, a prize just won is transferred to the credit meter after each win. In a further embodiment, the prize just won or total prizes are transferred to the credit meter when the record of remaining credit reaches a predetermined threshold. In some embodiments, remaining credits are paid out in response to an appropriate instruction. In other embodiments, unspent credit or winnings may be stored under the security of a password in the gaming machine for later access by the appropriate user.

As a post-manufacture addition to a gaming system, embodiments of the present invention may extend the commercial life of a gaming machine. In some embodiments the display functions of the switches as described above may be provided by a separate display. In some embodiments there may only be a single gaming machine operable in isolation i.e. not linked to other gaming machines or to a communal or jackpot game.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via various transmission or storage means such as computer network, floppy disc, CD-Rom or magnetic tape so that the software can be loaded onto one or more devices.

Although the invention has been described with reference to specific embodiments, it will be appreciated by those skilled in the art that it may be embodied in other forms.

The invention claimed is:

1. A method, performed by a gaming machine, of displaying performance data, comprising:
   recording, in a credit record, data indicative of the receipt of one or more gaming credit units from a user, wherein the one or more gaming credit units are for use as consideration for participation in a chance-based gaming activity provided via the gaming machine;
   updating the credit record when a gaming credit unit is used as consideration for participation in the chance-based gaming activity;
   recording the cumulative value of any prize awarded to a user, in respect of the chance based gaming activity, in a cumulative prize record, as opposed to recording that value in the credit record;
   recording the value of the credit used in a used credit record; and
   displaying, during a session of play, to a user of the gaming machine, via an display device of the gaming machine, a first display area for presenting the value of the credit record, and a second display area for presenting the cumulative prize record, and a third display area for presenting the value of the used credit record; wherein the first display area, second display area and third display area are presented such that the user is able to visually compare the value of the credit record, the value of the used credit record, and the value of the cumulative prize record.

2. A method according to claim 1 comprising receiving an instruction from the user to pay out the value of the cumulative prize record and, in response to that instruction, paying out the value of the cumulative prize record f to the user.

3. A method according to claim 1, in which the value of any prize awarded to the user is transferable to the credit record under the control of the user.

4. A method according to claim 1, in which, when any prize is awarded to the user in respect of the chance based gaming activity, data indicative of the value of the prize is displayed to the user via a fourth display area that is displayed via the display device of the gaming machine separately from the displays of the other data.

5. A method according to claim 1, comprising receiving an instruction from the user to pay out the value of the credit record and, in response to that instruction, paying out the value of the credit record to the user.

6. Apparatus for determining performance data in a gaming system, the apparatus comprising:
   a credit record for recording the receipt of one or more gaming credit units from a user, wherein the one or more gaming credit units are for use as consideration for participation in a chance-based gaming activity provided via the apparatus;
   a cumulative prize record for recording the cumulative value of any prize awarded to a user in respect of the chance-based gaming activity, as opposed to recording that value in the credit record;
   a used credit record for recording the value of the credit used; and
   a display device for displaying, during a session of play, a first display area for presenting the value of the credit record, and a second display area for presenting the value of the cumulative prize record to the user, and a third display area for presenting the value of the used credit record, such that the user is able to visually compare the value of the credit record, the value of the used credit record, and the value of the cumulative prize record.

7. Apparatus according to claim 6, configured for receiving an instruction from the user to pay out the value of the cumulative prize record and, in response to that instruction, paying out the value of the cumulative prize record to the user.

8. Apparatus according to claim 6 in which the value of any prize awarded to the user is transferable to the credit record under the control of the user.

9. Apparatus according to claim 6 in which, when any prize is awarded to the user, data indicative of the value of the prize is displayed to the user via a fourth display area that is displayed via the display device of the gaming machine separately from the displays of the other data.

10. Apparatus according to claim 6 configured for receiving an instruction from the user to pay out the value of the credit record and, in response to that instruction, paying out the value of the credit record to the user.

11. A method, performed by a gaming device, of displaying performance data for the gaming device, being a gaming device in which one or more gaming credits are usable as consideration for participation in a chance-based gaming activity, comprising:
   maintaining a credit record for recording the receipt of one or more gaming credit units from a user, wherein the one or more gaming credit units are for use as consideration for participation in a chance-based gaming activity provided via the device;
   recording data indicative of the total credit used as consideration for participation in the gaming activity for a period of gaming machine use;
   recording data indicative of the total winnings awarded to a user in respect of the gaming activity for the period of gaming machine use; and
   using the recorded data to provide to the user, during a session of play, via display areas on a display device, the value of the credit record and an indication of the difference between the value of the total credit used as consideration for participation in the gaming activity and total winnings awarded to the user in respect of the gaming activity for the period of gaming machine use, such that the user is able to visually compare the value of the credit record, the value of the total credit used, and the total winnings awarded.

12. Apparatus for determining performance data in a gaming machine in which one or more gaming credits are usable as consideration for participation in a chance-based gaming activity, comprising:
   a credit record for recording the receipt of one or more gaming credit units from a user, wherein the one or more gaming credit units are for use as consideration for participation in a chance-based gaming activity provided via the device;

a used credit meter for recording data indicative of the total credit used as consideration for participation in the gaming activity for a period of gaming machine use;

a prize meter for recording data indicative of the total winnings awarded to a user in respect of the gaming activity for the period of gaming machine use; and a controller operable to process the recorded data to provide to the user, during a session of play, via display areas on a display device, the value of the credit record and an indication of the difference between the value of the total credit used as consideration for participation in the gaming activity and total winnings awarded to the user in respect of the gaming activity for the period of gaming machine use such that the user is able to visually compare the value of the credit record, the value of the total credit used, and the total winnings awarded.

* * * * *